United States Patent
Child

(10) Patent No.: US 9,723,273 B2
(45) Date of Patent: Aug. 1, 2017

(54) CAMERA WITH A LENS CONNECTOR

(71) Applicant: Vivint, Inc., Provo, UT (US)

(72) Inventor: Michael D. Child, Lehi, UT (US)

(73) Assignee: Vivint, Inc., Provo, UT (US)

( * ) Notice: Subject to any disclaimer, the term of this patent is extended or adjusted under 35 U.S.C. 154(b) by 535 days.

(21) Appl. No.: 14/254,671

(22) Filed: Apr. 16, 2014

(65) Prior Publication Data

US 2015/0304613 A1 Oct. 22, 2015

(51) Int. Cl.
- *H04N 7/00* (2011.01)
- *H04N 7/18* (2006.01)
- *G08B 15/00* (2006.01)
- *G08B 13/196* (2006.01)

(52) U.S. Cl.
CPC ....... *H04N 7/183* (2013.01); *G08B 13/19626* (2013.01); *G08B 13/19697* (2013.01); *G08B 15/001* (2013.01)

(58) Field of Classification Search
CPC .......... H04N 7/183; H04N 1/00; H04N 5/225; H04N 1/00204; H04N 2201/0063; H04N 2201/0049; H04N 2201/0041; H04N 5/2251; H04N 7/181; H04N 7/18; G08B 13/19697; G08B 13/19626; G08B 15/001; G06F 1/16; E03F 7/12
See application file for complete search history.

(56) References Cited

U.S. PATENT DOCUMENTS

| | | | | |
|---|---|---|---|---|
| 6,091,453 A * | 7/2000 | Coan | .................... | H04N 5/2251 248/187.1 |
| 7,131,136 B2 * | 10/2006 | Monroe | ........... | G08B 13/19641 340/945 |
| 8,031,264 B2 * | 10/2011 | Iwamura | ............... | H04N 5/2251 348/143 |
| 8,525,877 B2 * | 9/2013 | Lortie | ....................... | E03F 7/12 348/82 |
| 2001/0037509 A1 * | 11/2001 | Kligman | ................ | H04N 7/181 725/105 |
| 2003/0081121 A1 * | 5/2003 | Kirmuss | ................ | B60R 11/02 348/143 |

(Continued)

FOREIGN PATENT DOCUMENTS

WO 2011011993 2/2011

OTHER PUBLICATIONS http://www.airtightsecurityplus.com/security_equipment/miniature-cameras/miniature-color-2.4ghz-camera-w-receiver; Download by waybackmachine, on Jun. 5, 2013.*

(Continued)

*Primary Examiner* — Frank Huang

(74) *Attorney, Agent, or Firm* — Holland & Hart LLP

(57) ABSTRACT

Methods and systems are described for using a video camera. According to at least one embodiment, a camera assembly for recording video footage includes a lens connector with a lens attached to a first end and a camera body connector on a second end. Further, the lens connector has a length that separates the video lens a distance from a camera body when the lens connector is attached to camera body and also housing at least one cable capable of transmitting a video signal recorded by the lens from the lens to the camera body. Also, the camera body has a power module and a communication module to communicate with a remote control unit.

20 Claims, 9 Drawing Sheets

(56) References Cited

U.S. PATENT DOCUMENTS

| | | | | |
|---|---|---|---|---|
| 2003/0149816 A1* | 8/2003 | Poo | ................ | G06K 19/07 710/62 |
| 2004/0038169 A1* | 2/2004 | Mandelkern | ............ | A61B 1/24 433/29 |
| 2004/0145676 A1* | 7/2004 | Lin | .................... | H04N 1/00204 348/374 |
| 2006/0159164 A1* | 7/2006 | Finizio | ............... | B64D 45/0015 375/240.01 |
| 2008/0036863 A1* | 2/2008 | Esbensen | ......... | G08B 13/19656 348/159 |
| 2008/0129822 A1* | 6/2008 | Clapp | ..................... | H04N 5/77 348/143 |
| 2008/0297587 A1* | 12/2008 | Kurtz | ................ | G06K 9/00335 348/14.08 |
| 2009/0256908 A1* | 10/2009 | Chen | ..................... | H04N 7/181 348/143 |
| 2010/0130054 A1* | 5/2010 | Le | ....................... | H01B 7/0838 439/502 |
| 2010/0198009 A1* | 8/2010 | Farr | .................. | A61B 1/00103 600/109 |
| 2011/0099095 A1* | 4/2011 | Moore | .................. | G06Q 10/063 705/30 |
| 2011/0144517 A1* | 6/2011 | Cervantes | ............... | A61B 5/08 600/538 |
| 2011/0189936 A1* | 8/2011 | Haspers | ................. | A47B 81/00 454/184 |
| 2011/0211069 A1* | 9/2011 | Sybesma | ................ | H04N 7/185 348/143 |
| 2011/0234807 A1* | 9/2011 | Jones | ............... | G08B 13/19641 348/159 |
| 2012/0075465 A1* | 3/2012 | Wengrovitz | ........... | H04N 7/181 348/143 |
| 2012/0086802 A1* | 4/2012 | Eng | ........................... | C02F 1/00 348/135 |
| 2012/0281095 A1* | 11/2012 | Trenciansky | ............ | H04N 7/18 348/159 |
| 2013/0019124 A1* | 1/2013 | Grimshaw | .......... | G06F 11/2015 714/24 |
| 2013/0061624 A1* | 3/2013 | Zwinkels | ........... | H05K 7/20745 62/259.4 |
| 2016/0134737 A1* | 5/2016 | Pulletikurty | .......... | G06F 3/0227 715/735 |

OTHER PUBLICATIONS

Supercircuits.com, High Resolution Low Light Color Snake Camera, obtained from http://www.supercircuits.com/security-cameras/micro-video-cameras/hi-res-low-light-color-snake-camera-pc229xp, 2014.

English Abstract and English Machine Translation of WO2011011993, Feb. 3, 2011.

\* cited by examiner

CAMERA WITH A LENS CONNECTOR

BACKGROUND

Security systems often include security cameras that are positioned to view areas of interest. These cameras are equipped to take footage of activity that occurs within their field of view. Such footage may be stored locally in a format that allows personnel to view the footage in real time or at a later time. In other examples, such security cameras are connected to a cloud based storage system where the video footage is stored. Such security cameras may be located indoor and/or outdoor environments.

Analysis of the recorded footage can be automated with program applications that organize digital video footage into a searchable database. This allows a user to search the video footage by time or by other parameters. Thus, the user can identify the date and time of day of the desired footage to ascertain if any events of interest occurred during the identified time period.

SUMMARY

Methods and systems are described for remote power management of an adapter. According to at least one embodiment, a camera assembly for recording video footage includes a lens connector with a lens attached to a first end and a camera body connector on a second end. Further, the lens connector has a length that separates the video lens a distance from a camera body when the lens connector is attached to camera body and also housing at least one cable capable of transmitting a video signal recorded by the lens from the lens to the camera body. Also, the camera body has a power module and a communication module to communicate with a remote control unit.

The camera assembly may include a wireless transmitter. In some cases, the camera assembly is configured to operate in a visual light spectrum and/or an infrared light spectrum. Further, the remote control unit in communication with camera body may include a premise security module and/or a home automation system module.

The lens connector may be made of a flexible construction and exhibit a pliable characteristic where the lens connector maintains a bent shape after a bending force is removed from the lens connector. In some cases, the camera assembly includes a release mechanism that is arranged to disconnect the second end of the lens connector from the camera body. The camera body may be configured to be mounted to a wall or placed on a stable surface. The camera body may include a power supply module that includes a cord with a plug to be inserted into an alternating current socket incorporated into a wall of a building.

Additionally, the camera assembly may include a processor and memory in electronic communication with the processor. Instructions may be stored in the memory where the instructions are executed by the processor to receive the video signal from the lens connector and to send the video signal to the remote control unit. In some instances, the instructions are also executable by the processor to receive activation commands from a motion detector or another type of sensor.

In another aspect of the principles described herein, a method includes receiving, with a camera body, a video signal from a lens connector that supports a lens on a first end of a flexible construction that exhibits a pliable characteristic where the lens connector maintains a bent shape after a bending force is removed from the lens connector, and sending, with the camera body, the video signal to a remote control unit in wireless communication with the camera body.

In yet another aspect of the principles described herein, an automation and/or security system includes a camera assembly with a lens connector having a lens attached to a first end and a camera body connected to a second end. The lens connector has a length that separates the lens a distance from a camera body when the lens connector is attached to the camera body. The lens connector also houses at least one cable capable of transmitting a video signal recorded by the lens from the lens to the camera body. Further, the system includes a remote control unit in wireless communication with the camera body.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
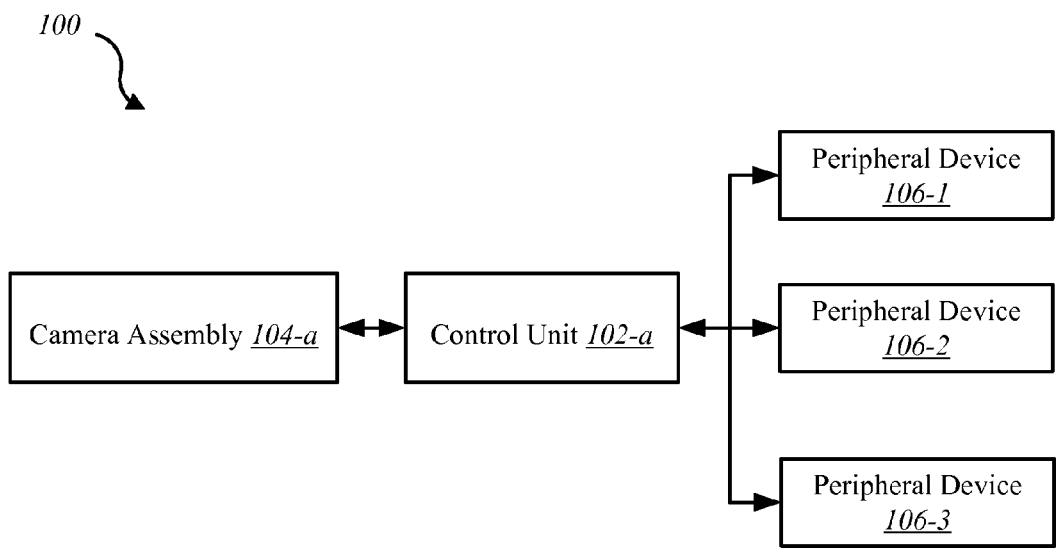
FIG. 1 is a block diagram of an example of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security, and related security systems and automation for use in commercial and business settings. More specifically, the systems and methods described herein relate to a camera assembly that has a lens connector that positions the lens at a distance away from the camera body.

Often, security cameras are set up to record footage of rooms and other locations within buildings and their surrounding areas. The recorded footage can be used to discover if intruders entered the premise and to determine how events unfolded. In some cases, intruders try to avoid security cameras, disconnect the cameras, or try to destroy the camera or its recorded footage. In some cases, just the mere presence of the security camera causes an individual intent on committing an unlawful act to conceal weapons or other evidence until he or she is out of the security camera's view.

The principles described herein provide a camera assembly where the lens can be positioned to view an open area while the body of the camera assembly can be concealed or hidden. For example, the camera body can be positioned behind a book, plant, or another object such that the camera body is obscured from view. At the same time, the lens connector can be bent to position the lens of the camera to include the internal space of a room or another open area to be within the lens' field of view. Thus, the camera assembly provides the benefit of viewing a desired area without being clearly visible.

As used herein, the term "module" includes a combination of hardware and programmed instructions that are necessary for performing the designated function of the module. Components of the modules may be located on the same physical device or some of the components may be located at remote locations that are in communication with the other components of the module.

FIG. 1 is a block diagram depicting one embodiment of an environment 100 in which the present systems and methods may be implemented. In this example, the environment includes a control unit 102-a that is in communication with a camera assembly 104-a. The control unit 102-a may be in direct communication with the camera assembly 104-a or in indirect communication with the camera assembly 104-a through an intermediate device, such as a cloud based device or a mobile device. In the example of FIG. 1, the control unit 102-a is also in communication with multiple peripheral devices 106-1, 106-2, 106-3.

The control unit 102-a may control at least a part of the security system and/or automation system. For example, each of the peripheral devices 106-1, 106-2, 106-3 may send information to the control unit 102-a where the signals are processed. The peripheral devices 106-1, 106-2, 106-3 may include, for example, an audio sensor, forced entry sensor, shock sensor, proximity sensor, boundary sensor, appliance sensor, light fixture sensor, temperature sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, heartbeat sensor, breathing sensor, oxygen sensor, carbon dioxide sensor, brain wave sensor, movement sensor, voice sensor, other types of sensors, actuators, or combinations thereof.

These peripheral devices 106-1, 106-2, 106-3 may send raw information to the control unit 102-a where no processing has occurred prior to sending the information to the control unit 102-a. In other examples, at least a portion of the information is processed prior to sending the information to the control unit 102-a. In some cases, at least most of the processing occurs at the control unit 102-a.

The control unit 102-a may make decisions based on these communications from the peripheral devices 106-1, 106-2, 106-3. For example, based on the information sent from the peripheral devices 106-1, 106-2, 106-3 to the control unit 102-a, the control unit 102-a may make a decision to activate an alarm, adjust a climate control setting, open or close a window, lock or unlock a door, control a security parameter, manage energy consumption, check the status of a door, locate a person or item, control lighting, control cameras, receive notifications regarding a current status or anomaly associated with a building, perform another task, or combinations thereof.

In some examples, the control unit 102-a includes a user interface where the user can interact with the control unit 102-a. For example, the user can manually give instructions to the control unit 102-a to adjust a network setting, actuate a peripheral device 106, perform another system task, or combinations thereof.

Any appropriate mechanism for communicating between the control unit 102-a, the camera assembly 104-a, and the peripheral devices 106-1, 106-2, 106-3 may be used in accordance with the principles described herein. In some examples, a wireless network is utilized to communicate between the control unit 102-a and the other devices. Examples of networks that may be used may include, but are not limited to, local area networks (LAN), wide area networks (WAN), virtual private networks (VPN), wireless networks (using 802.11, for example), and/or cellular networks (using 3G and/or LTE, for example), Bluetooth networks, z-wave networks, Zigbee networks, other types of networks, or combinations thereof.

In some examples, the camera assembly incorporates a closed-circuit television camera that wirelessly transmits video and/or audio signals to the control unit 102-a. Any of the above mentioned network types and/or associated communication protocols may be used.

The camera assembly may include a camera body that can be located and/or installed in any appropriate location. For example, the camera body may be mounted to a wall, placed on a shelf, placed on another stable surface, hung from a structure, positioned through another mechanism, or combinations thereof. The ability of the camera body to communicate wirelessly with the remote control unit 102-a enables the camera body to be situated in may locations that are not dependent on the length of a data cable to the remote control unit 102-a. Further, in examples where the camera body includes batteries, the camera body is additionally enabled to be placed in even more locations that are not dependent on the length of a power cord to a power socket or other power source.

Figure 2:
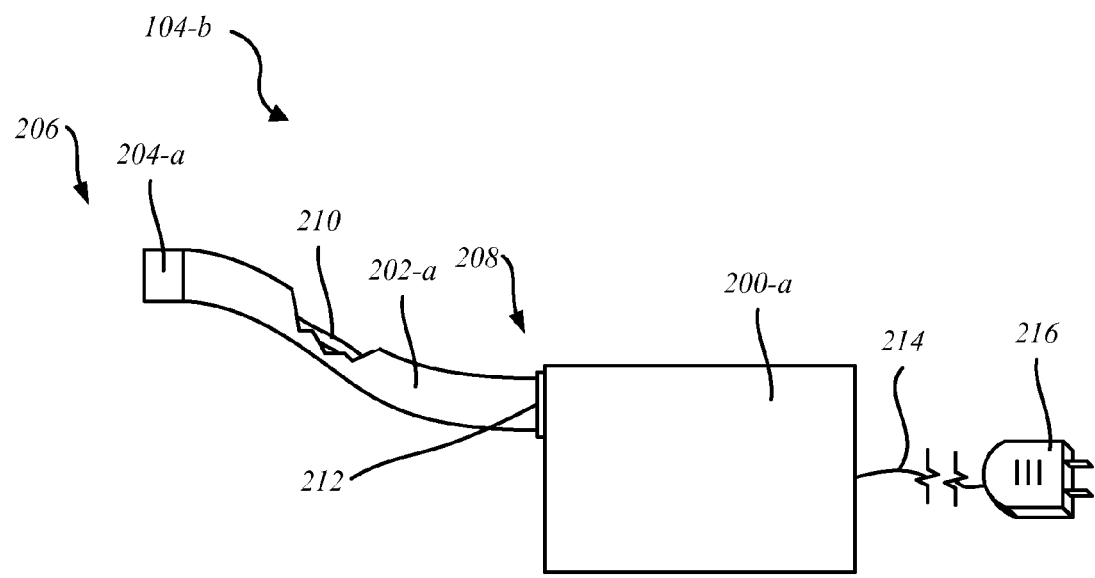
FIG. 2 is a side diagram of an example of a camera assembly of the environment shown in FIG. 1.

FIG. 2 is a side diagram of an example of a camera assembly 104-b. In this example, the camera assembly 104-b includes a camera body 200-a, a lens connector 202-a, and a lens 204-a. The lens 204-a is connected at a first end 206 of the lens connector 202-*a*, and camera body 200-*a* is attached at a second end 208 of the lens connector 202-*a*.

The lens 204-*a* includes at least one transparent material through which light can pass. In some examples, the transparent material is glass, quartz, fluorite, plastic, acrylic, germanium, another type of transparent materials, or combinations thereof. The lens may also include a digitizing mechanism that can convert light passing through the lens into a digital format.

The surface of the transparent material may be coated to reduce abrasion, reduce flare, adjust surface reflectance, balance color, control an optical property, provide another benefit, or combinations thereof. In some instances, the curvature of the transparent material is set so that an angle of incidence and an angle of refraction are similar to minimize aberrations.

In some examples, the lens has the ability to focus on objects within its field of view. For example, moving elements of the lens can be adjusted to bring objects of interest into focus. The lens may include an adjustable focal length that varies as movable elements of the lens are moved. Such movement may be accomplished with a cam connected to an electric motor that receives power from the camera body. The zoom range may be controlled with a maximum aperture and the focal length of the lens. In some examples, the lens also has an ability to pan, to zoom, to tilt, to pedestal, to dolly, to truck, to perform another type of movement, or combinations thereof.

The lens may have an ability to operate in just the visual spectrum. However, in other examples, the lens has the ability to operate in the infrared spectrum instead of or in combination with the visual light spectrum. The infrared spectrum may include both of the near-infrared spectrum and the far-infrared spectrum or just portions thereof. An infrared-passing filter may be used to allow infrared light to pass through to the lens, but block at least some of the visible light spectrum.

The lens connector 202-*a* includes a lengthwise cavity that houses at least one cable 210 that can transmit the digital images from the lens to the camera body 200-*a*. Any appropriate type of cable may be used to transmit the digital signals to the camera body 200-*a*. In the example of FIG. 2, a portion of the lens connector is removed to illustrate the location of the cable 210.

In some examples, the lens connector's cavity is formed with an outer sheath, an outer tube, or another type of structure. Such a structure may be made of a flexible construction that exhibits pliable characteristics. For example, the pliable characteristics may include that the lens connector maintains a bent shape after a bending force is removed from the lens connector. In such an example, a user may bend an otherwise straight lens connector to form a right angle, and the when the user lets go of the lens connector, the lens connector will maintain that right angle or substantially maintain that right angle. Such characteristics allow the lens to be angled in directions that are independent of the orientation of the camera body 200-*a*. Further, the lens 204-*a* can be positioned at different heights, different angles, different distances, and other different orientations independent of the orientation of the camera body 200-*a*. Such pliability and flexibility allows the camera body 200-*a* to be positioned behind objects while the lens can be positioned to have a field of view of an open space.

In some examples, the second end 208 of the lens connector 202-*a* includes a release mechanism 212 that allows for the lens connector 202-*a* to be released from the camera body 200-*a*. Such a release mechanism 212 may include a mount that is capable of connecting multiple other types of lens connectors to the camera body 200-*a*. For examples, a user of the camera assembly 104-*b* may desire to operate the lens 204-*a* without the lens connector 202-*a*. In such an example, the user may not desire to conceal or obscure the presence of the camera body 200-*a* thereby not needing to use the lens connector 202-*a*. In such a situation, the user can attach a lens directly to the mount without an intermediate lens connector. In other examples, the user may desire to obscure the presence of the camera body 200-*a* behind a specific object while also desiring to have the lens at a specific position to have a specific field of view. In this scenario, a standard length of the lens connector 202-*a* may be incompatible to make such an arrangement work. To accommodate, the user may replace the lens connector of the standard length with a lens connector of another length. Additionally, the lens with different features may be attached to the mount of the release mechanism. Such features may include visual light features, infrared features, optical features, focal length features, zoom features, panning features, color features, other features, or combinations thereof. The release mechanism may include electrical contacts that allow the cable to transmit signals to the camera body.

The camera body 200-*a* may include a processor that causes the digital or analog signals from the cable to be received into a local memory storage. Such signals may be sent in real time to the remote control unit 102. In other examples, the signals are temporally stored in the camera body 200-*a* before being sent to the remote control unit 102. Such memory may include caches, buffers, volatile memory, non-volatile memory, flash memory, magnetic storage memory, optical storage memory, other types of memory, or combinations thereof. In some examples, the camera body 200-*a* has a back end that is in communication with the remote control unit 102 and is capable of receiving instructions for when to send the data to the control unit 102. In other examples, the back end of the camera body 200-*a* determines the time to send the data to the control unit or causes a predetermined protocol to be followed for sending the data to the control unit.

The camera body 200-*a* may also include the ability to further process the signals from the cable. For example, the camera body 200-*a* may have the ability to compress the signal data, filter wavelengths, filter amplitudes, filter frequencies, deduplicate signals, adjust optical properties, perform other processing, or combinations thereof.

Further, the camera body 200-*a* may include a cord 214 with a plug 216 arranged to be inserted into an alternating current socket incorporated into a wall of a building. The camera body may receive sufficient power to operate the components of the camera assembly 104-*b*. In other examples, the components of the camera assembly 104-*b* are powered, at least in part, with internal batteries.

Figure 3:
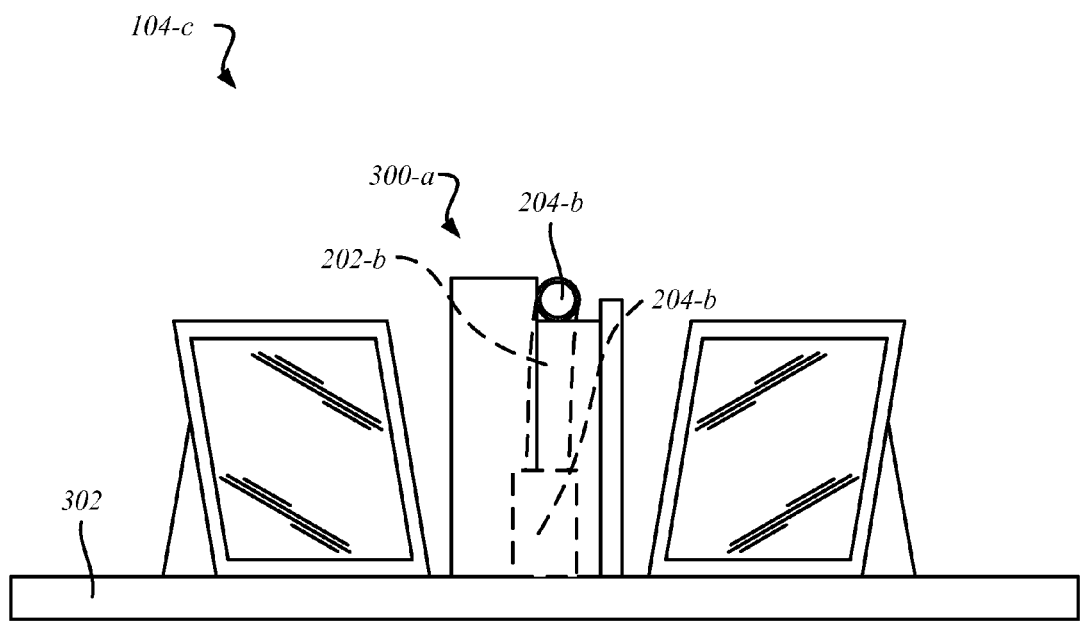
FIG. 3 is a concealed view of an example of a camera assembly of the environment of FIG. 1.

FIG. 3 is a concealed view of an example of a camera assembly 104-*b*. In this example, the camera body 200-*b* is concealed behind a set of books 300-*a* sitting on a shelf 302. The lens connector 202-*b* connects the lens 204-*b* to the camera body 200-*b*. Even though the camera body 200-*b* is hidden from view, the lens 204-*b* is visible as it is positioned above the books 300-*a* with the lens connector 202-*b*. While it is possible that an intruder or another type of mischievous individual could see the lens 204-*b*, the likelihood of such an individual seeing the lens 204-*b* with the camera body 200-*b* concealed in the manner depicted in the example of FIG. 3 is greatly reduced.

In the example of FIG. 3, the lens connector 202-*b* may be bent to follow the top of the books 300-*a*. By keeping the lens 204-*b* as close to the top of the books 300-*a* as possible, the lens 204-*b* is less likely to draw attention to itself. While the example of FIG. 3 illustrates the lens connector 202-*b* being bent around the top of the books 300-*b*, the lens connector 202-*b* can be bent in any appropriate manner to provide an open view for the lens 204-*b* while still concealing the camera body 200-*b*. For example, the lens connector 202-*b* may be bent around the sides of the books 300-*a*, underneath the shelf 302, in another configuration, or combinations thereof.

Figure 4:
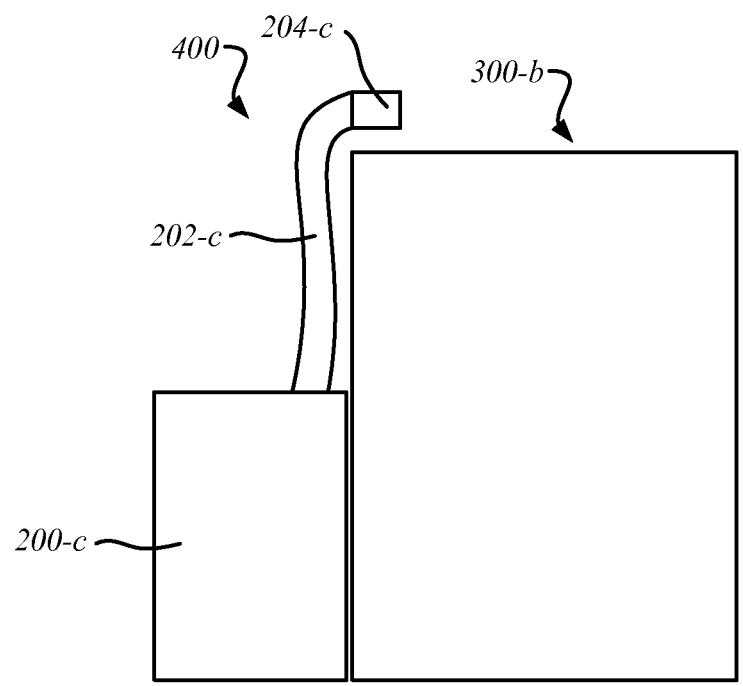
FIG. 4 is a side view of an example of a camera assembly of the environment of FIG. 1.

FIG. 4 is a side view of an example of a camera assembly 104-*d*. In this example, the camera body 200-*b* is positioned behind the books 300-*b*. The lens connector 202-*c* is bent to form an angle 400 around the edge of the books 300-*b*. The lens 204-*c* is oriented to have a field of view over the books 300-*b*.

Figure 5:
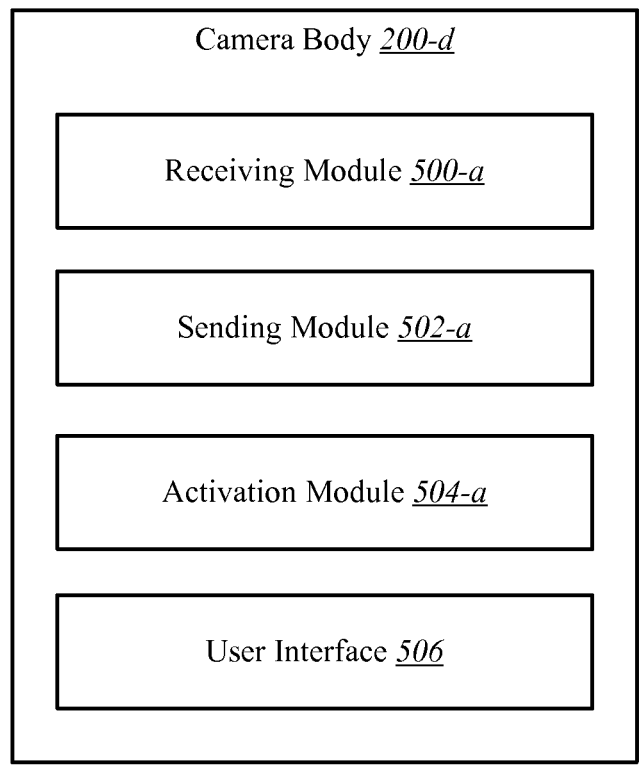
FIG. 5 is a block diagram of an example of a camera body of the camera assembly of FIG. 1.

FIG. 5 is a block diagram illustrating one example of a camera body 200-*d*. In this example, the camera body 200-*d* has a receiving module 500-*a*, a sending module 502-*a*, and an activation module 504-*a*.

The receiving module 500-*a* is capable of receiving video signals from the lens connector 202. In some examples, the receiving module 500-*a* also receives audio signals. A microphone associated with the camera assembly 104 may be incorporated into the camera body, the lens, a device independent of the camera assembly 104, or combinations thereof. The receiving module 500-*a* may cause the signals to be stored locally or transferred to the sending module 502-*a*.

The sending module 502-*a* has the capability of sending the signals to the control unit 102. The sending module 502-*a* may follow a predetermined wireless protocol to send the signals to the control unit 102. In some examples, the control unit 102 requests the signals from the camera assembly 104. In other examples, the sending module 502-*a* sends the signals to the control unit 102 without request.

The activation module 504-*a* includes the capability of activating the camera assembly to record video footage. In some examples, the camera assembly 104 includes a sleep mode where at least one function of the camera assembly deactivates in response to inactivity on the premise. The activation module 504-*a* may cause at least one component of the camera assembly 104 to activate in response to a signal from a motion detector, a microphone, an accelerometer, a door sensor, a window sensor, a fire sensor, a smoke sensor, a carbon monoxide sensor, a light sensor, an occupancy sensor, another type of sensor, or combinations thereof. Such signals may be sent directly to the camera body 200-*d*. In other examples, such signals are sent indirectly to the camera body 200-*d*, such as through the control unit 102, a mobile device, a cloud based device, another type of device, or combinations thereof.

In the example of FIG. 5, the camera body 200-*d* has a user interface 506. The user interface 506 may allow a user to input a command into the camera, such as an activation command, a setting command, a microphone command, a zoom command, a color command, an energy conservation command, another type of command, or combinations thereof. Further, the user interface 506 can communicate messages to the user. For example, the user interface 506 can display a security status, a security option, a camera status, a camera option, an activation status, an activation option, another type of information, or combinations thereof. Any appropriate type of user interface may be used. For example, the user interface 506 may include a button, a dial, a display, a touch screen, a lever, another type of mechanism, or combinations thereof.

Figure 6:
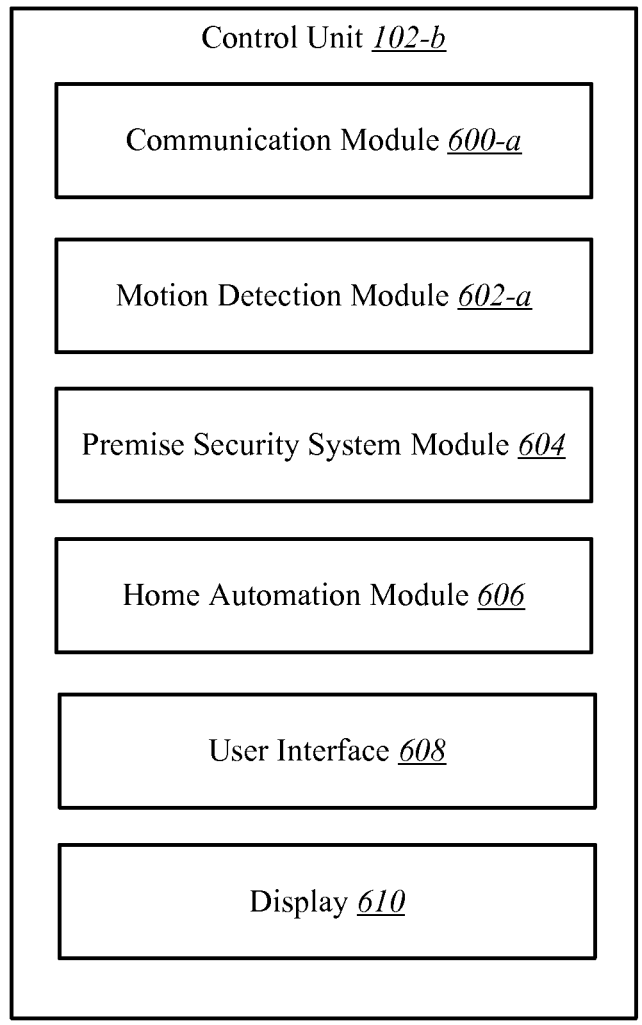
FIG. 6 is a block diagram of an example of a control unit of the environment of FIG. 1.

FIG. 6 is a block diagram illustrating one example of a control unit 102-*b*. In this example, the control unit 102-*b* has a communication module 600-*a*, a motion detection module 602-*a*, a premise security system module 604, a home automation module 606, a user interface 608, and a display 610.

The communication module 600-*a* can be configured to communicate directly with the camera assembly 104 or indirectly with the camera assembly 104 by communicating through a cloud based device, a mobile device, another type of device, or combinations thereof. Based on input from the user interface 604, the communication module 600 sends instructions to the camera assembly 104. Any appropriate type of wireless transceiver may be used in accordance with the principles described herein. For example, the communication module 600 may be capable of communications using the ZigBee protocol, Z-Wave protocol, BlueTooth protocol, Wi-Fi protocol, Global System for Mobile Communications (GSM) standard, another standard, or combinations thereof.

The motion detection module 602-*a* can detect motion on the premise associated with the camera assembly 104. In some examples, a motion detection module 602-*a* include a motion detector. In other examples, the motion detection module 602-*a* includes other types of sensors that can be used to infer motion. For examples, such sensors may include, but are not limited to, microphones, temperature sensors, door sensors, window sensors, optical sensors, lighting sensors, climate sensors, other types of sensors, or combinations thereof. Such sensors may be incorporated directly into the control unit 102-*b*. In other examples, such sensors are one of the peripheral devices 106 depicted in the environment 100 of FIG. 1. In such an example, the motion detector or other type of sensor may be positioned to detect an activity of interest within the field of view of the camera assembly's lens 204. In response to detecting such an activity, a notification may be sent from the motion detector to the control unit 102-*b*. In response to receiving the notification from the motion detector, the control unit 102 can send a command to the camera body's back end to activate. In such an example, the camera assembly may include a sleep mode where the camera assembly deactivates due to a lack of activity on the premise.

The premise security system module 604 can control at least one function of a security system incorporated into the building. Such functions may include monitoring the premise with video camera, microphone, accelerometers, door sensors, window sensors, other types of sensors, or combinations thereof. Further, the function of the security system controlled by the premise security system module 604 may include calling authority in response to a security threat, activating an alarm, activating an actuator, locking a door, locking a computer, locking a safe, performing another type of action, or combinations thereof. In some examples, the multiple peripheral devices 106 in the environment of FIG. 1 include at least one security device that is in communication with the premise security system module 604.

The home automation module 606 can control at least one function of a home automation system incorporated into the building. Such functions may include control the internal climate of a building, generating power for use in the building, conserving energy in the building, performing tasks associated with cleaning, lawn maintenance, health related tasks, weather warnings, lighting, other types of tasks, or combinations thereof. In some examples, the multiple peripheral devices 106 in the environment of FIG. 1 include at least one home automation device that is in communication with the premise security system module 604.

The user interface 608 may allow a user to input a command into the control unit 102-*b*, such as a security command, a setting command, a climate command, a lighting command, an energy conservation command, another type of command, or combinations thereof. Further, the user interface 608 can communicate messages to the user. For example, the user interface 608 can display a security status, a home automation status, a security option, a home automation option, another type of information, or combinations thereof. Any appropriate type of user interface may be used. For example, the user interface 608 may include a button, a dial, a display, a touch screen, a lever, a key pad, another type of mechanism, or combinations thereof. In some instances, the display 610 is part of the user interface 608. The display 610 may communicate a temperature status, an activation status, an energy consumption status, another type of status, or combinations thereof.

Figure 7:
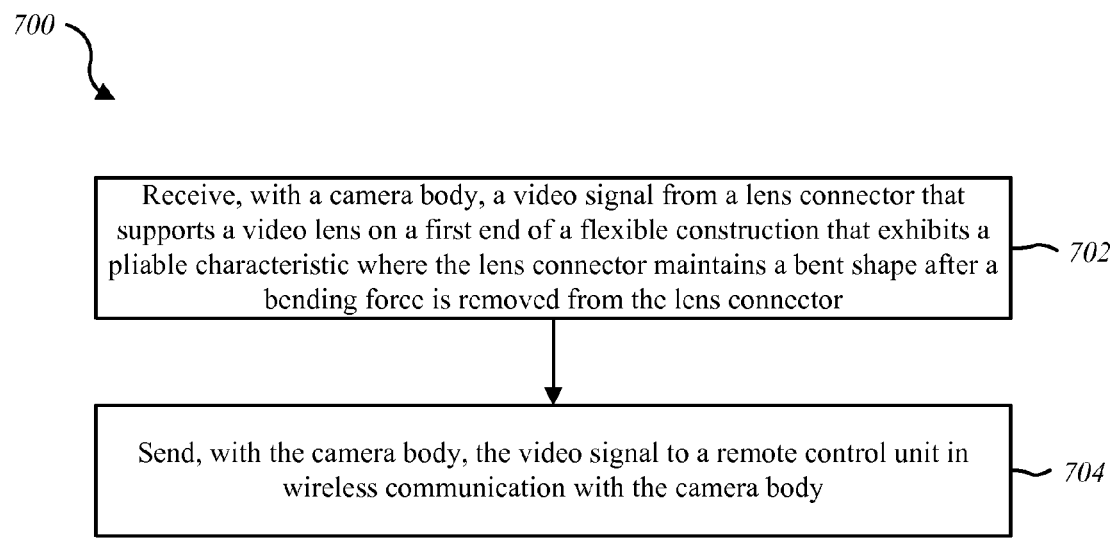
FIG. 7 is a flow diagram illustrating an example of a method for operating a camera assembly.

FIG. 7 is a flow diagram illustrating an example of a method 700 for using a camera assembly. In this example, the method 700 includes receiving 702, with a camera body, a video signal from a lens connector that supports a lens on a first end of a flexible construction that exhibits a pliable characteristic where the lens connector maintains a bent shape after a bending force is removed from the lens connector. The method 800 further includes sending 704, with the camera body, the video signal to a remote control unit in wireless communication with the camera body. Such a method 700 may be implemented with a camera assembly 104 and/or camera body 200 shown in FIGS. 1-5. In other examples, method 700 may be performed generally by the environment 100 shown in FIG. 1.

At block 702, video signals from the video lens are received at the camera body. The signals are sent through the lens connector, which is flexible and/or pliable enough to bend into different configurations. Such a lens connector allows the camera body to be physically located at a distance apart from the lens.

At block 704, the signals received at the camera body are sent to the remote control unit. In some examples, the camera body routes the data from the lens connector to the control unit. In other examples, the camera body performs some processing on the data before sending the data on to the control unit.

Figure 8:
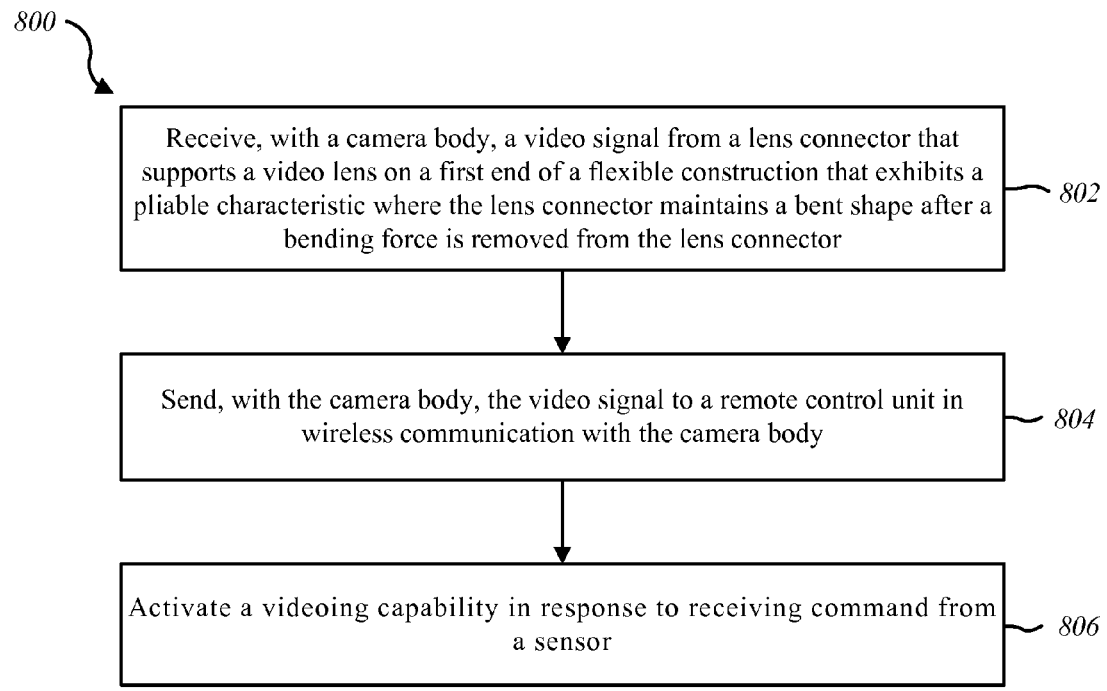
FIG. 8 is a flow diagram illustrating an example of a method for operating a camera assembly.

FIG. 8 is a flow diagram illustrating an example of a method 800 for using a camera assembly. In this example, the method 800 includes receiving 802, with a camera body, a video signal from a lens connector that supports a video lens on a first end of a flexible construction that exhibits a pliable characteristic where the lens connector maintains a bent shape after a bending force is removed from the lens connector. The method 800 further includes sending 804, with the camera body, the video signal to a remote control unit in wireless communication with the camera body and activating 806 a videoing capability in response to receiving a command from a motion detector. Such a method 700 may be implemented with a camera assembly 104 and/or camera body 200 shown in FIGS. 1-5. In other examples, method 800 may be performed generally by the environment 100 shown in FIG. 1.

At block 806, at least one function of the camera assembly is activated in response to a command from a device that detects something of interest on the premise. Such a device may be incorporated into the camera assembly or it may be independent of the camera assembly. Further, the device may communicate directly with the camera assembly. However, in some examples, the device communicates through the control unit, a mobile device, a cloud based device, another type of device, or combinations thereof. Any appropriate type of device may be used to send an activation command to the camera assembly, such as a motion detector, a microphone, an occupancy sensor, a temperature sensor, an accelerometer, a door sensor, a window sensor, another type of sensor, or combinations thereof.

Figure 9:
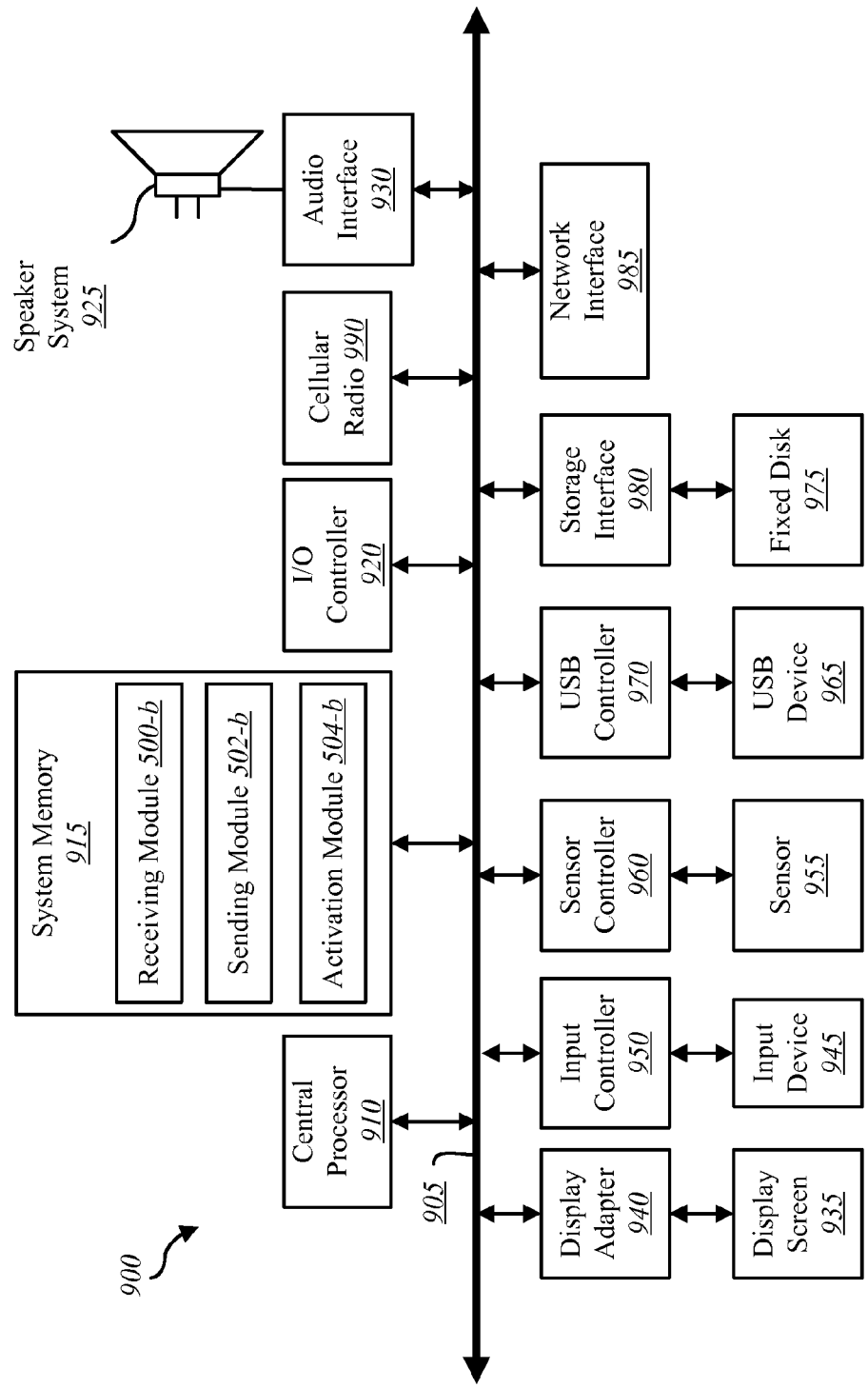
FIG. 9 is a block diagram of a computer system suitable for implementing the present systems and methods of FIG. 1.

FIG. 9 depicts a block diagram of a controller 900 suitable for implementing the present systems and methods. The controller 900 may be an example of the control unit 102 or camera assembly 104 in FIG. 1. In one configuration, controller 900 includes a bus 905 which interconnects major subsystems of controller 900, such as a central processor 910, a system memory 915 (typically RAM, but which may also include ROM, flash RAM, or the like), an input/output controller 920, an external audio device, such as a speaker system 925 via an audio output interface 930, an external device, such as a display screen 935 via display adapter 940, an input device 945 (e.g., remote control device interfaced with an input controller 950), multiple USB devices 965 (interfaced with a USB controller 970), one or more cellular radios 990, and a storage interface 980. Also included are at least one sensor 955 connected to bus 905 through a sensor controller 960 and a network interface 985 (coupled directly to bus 905).

Bus 905 allows data communication between central processor 910 and system memory 915, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a receiving module 500-*b*, a sending module 502-*b*, or a activation module 504-*b* may be used to implement the present systems and methods may be stored within the system memory 915. These modules may be an example of the modules illustrated in FIG. 5. Applications resident with controller 900 are generally stored on and accessed via a non-transitory computer readable medium, such as a hard disk drive (e.g., fixed disk 975) or other storage medium. Additionally, applications can be in the form of electronic signals modulated in accordance with the application and data communication technology when accessed via the network interface 985.

Storage interface 980, as with the other storage interfaces of controller 900, can connect to a standard computer readable medium for storage and/or retrieval of information, such as a fixed disk drive 975. Fixed disk drive 975 may be a part of controller 900 or may be separate and accessed through other interface systems. Network interface 985 may provide a direct connection to a remote server via a direct network link to the Internet via a POP (point of presence). Network interface 985 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 900 wirelessly via network interface 985. In one configuration, the cellular radio 990 may include a receiver and transmitter to wirelessly receive and transmit communications via, for example, a cellular network.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 9 need not be present to practice the present systems and methods. The devices and subsystems can be interconnected in different ways from that shown in FIG. 9. The aspect of some operations of a system such as that shown in FIG. 9 are readily known in the art and are not discussed in detail in this application. Code to implement the present disclosure can be stored in a non-transitory computer-readable medium such as one or more of system memory 915 or fixed disk 1075. The operating system provided on controller 900 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A camera assembly for recording video footage, comprising:
    a detachable lens connector with a lens attached to a first end and a camera body on a second end; and
    the lens connector comprising a length that separates the lens a distance from the camera body, the camera body being positioned at a first location and the lens being positioned at a second location so that a monitoring area is within a field of view of the lens, wherein the second location is different from the first location, the first location being obstructed by an object and the second location being unobstructed by the object, and wherein the lens connector houses at least one cable capable of transmitting a video signal recorded by the lens from the lens to the camera body;
    wherein the camera body comprises a sending module in communication with a remote control unit, wherein the camera body is powered separately from the remote control unit;
    wherein the camera assembly is in communication with a security system, and the security system comprises a motion detector unobstructed by the object and the security system does not comprise the object; and
    wherein the camera body is configured to activate based at least in part on a signal from the motion detector.

2. The camera assembly of claim 1, wherein the sending module comprises a wireless transmitter.

3. The camera assembly of claim 1, wherein the lens connector is made of a flexible construction and exhibits a pliable characteristic where the lens connector maintains a bent shape after a bending force is removed from the lens connector.

4. The camera assembly of claim 1, wherein the camera assembly is configured to operate in a visual light spectrum.

5. The camera assembly of claim 1, wherein the camera assembly is configured to operate in an infrared light spectrum.

6. The camera assembly of claim 1, wherein the remote control unit comprises a premise security system module.

7. The camera assembly of claim 1, wherein the remote control unit comprises a home automation system module.

8. The camera assembly of claim 1, wherein the lens connector is configured to detach based at least in part on a release mechanism that is arranged to disconnect the second end of the lens connector from the camera body.

9. The camera assembly of claim 1, wherein the camera body comprises:
a processor;
memory in electronic communication with the processor; and
instructions stored in the memory, the instructions being executable by the processor to:
receive the video signal from the lens connector; and
send the video signal to the remote control unit.

10. The camera assembly of claim 9, wherein the instructions further are executable to receive an activation command from a sensor.

11. The camera assembly of claim 1, wherein the object comprises a wall and the camera body is configured to be mounted to the wall.

12. The camera assembly of claim 1, wherein the camera body comprises a cord with a plug arranged to be inserted into an alternating current socket incorporated into a wall of a building.

13. A method for using a video camera in a security system, comprising:
receiving, with a camera body positioned at a first location, wherein the first location is obstructed by an object, a video signal from a detachable lens connector that supports a video lens on a first end of a flexible construction that exhibits a pliable characteristic where the lens connector maintains a bent shape after a bending force is removed from the lens connector, wherein the video lens is positionable at a second location so that a monitoring area is within a field of view of the lens, wherein the second location is different from the first location, the second location being unobstructed by the object; and
sending, with the camera body, the video signal to a remote control unit in wireless communication with the camera body, wherein the camera body is powered separately from the remote control unit;
wherein the security system comprises a motion detector unobstructed by the object and the security system does not comprise the object; and wherein the camera body is configured to activate based at least in part on a signal from the motion detector.

14. The method of claim 13, further comprising activating a videoing capability in response to receiving the signal from the motion detector.

15. A security system, comprising:
a camera assembly with a detachable lens connector having a lens attached to a first end and a camera body on a second end;
the lens connector comprising a length that separates the lens a distance from the camera body, the camera body being positioned at a first location and the lens being positioned at a second location so that a monitoring area is within a field of view of the lens, wherein the second location is different from the first location, the first location being obstructed by an object and the second location being unobstructed by the object, and wherein the lens connector houses at least one cable capable of transmitting a video signal recorded by the lens from the lens to the camera body; and
a remote control unit in wireless communication with the camera body, wherein the camera body is powered separately from the remote control unit; and
wherein the camera assembly is in communication with the security system, and the security system comprises a motion detector unobstructed by the object and the security system does not comprise the object; and
wherein, the camera body is configured to activate based at least in part on a signal from the motion detector.

16. The security system of claim 15, wherein the lens connector is made of a flexible construction and exhibits a pliable characteristic where the lens connector maintains a bent shape after a bending force is removed from the lens connector.

17. The security system of claim 15, wherein the lens connector is configured to detach based at least in part on a release mechanism that is arranged to disconnect the second end of the lens connector from the camera body.

18. The security system of claim 15, wherein the camera body comprises:
a processor;
memory in electronic communication with the processor; and
instructions stored in the memory, the instructions being executable by the processor to:
receive the video signal from the lens connector; and
send the video signal to the remote control unit.

19. The security system of claim 18, wherein the instructions further are executable to receive a command to activate a video capability in response to receiving a message from a motion detector.

20. The security system of claim 15, wherein the object comprises a wall and the camera body is configured to be mounted to the wall.

* * * * *